United States Patent

Uchi et al.

[11] Patent Number: 6,038,124
[45] Date of Patent: Mar. 14, 2000

[54] ALUMINUM ELECTRODE FOIL FOR ELECTROLYTIC CAPACITOR AND ELECTROLYTIC CAPACITOR USING THE FOIL

[75] Inventors: Hidenori Uchi; Masakazu Furukawa, both of Kitaibarakishi; Tadao Fujihira, Sakaishi; Ichizo Tsukuda, Kishiwadasi; Eizo Isoyama, Nara, all of Japan

[73] Assignees: KDK Corporation, Ibaraki; Showa Aluminum Corporation, Osaka, both of Japan

[21] Appl. No.: 08/995,967

[22] Filed: Dec. 22, 1997

[30] Foreign Application Priority Data

Dec. 25, 1996 [JP] Japan .................................. 8-359898

[51] Int. Cl.$^7$ ...................................................... H01G 9/04
[52] U.S. Cl. ........................... 361/509; 361/500; 361/502; 361/503; 361/508; 361/516
[58] Field of Search ..................................... 361/500, 502, 361/503, 508, 509, 523, 525, 528, 529, 532

[56] References Cited

U.S. PATENT DOCUMENTS

| | | | |
|---|---|---|---|
| 2,079,516 | 4/1937 | Lilienfeld | 361/529 |
| 3,997,339 | 12/1976 | Fickelscher | 75/138 |
| 4,763,229 | 8/1988 | Ohtuka et al. | 361/529 |
| 5,194,127 | 3/1993 | Endoh et al. | 204/129.85 |

*Primary Examiner*—Kristine Kincaid
*Assistant Examiner*—Eric W. Thomas

[57] ABSTRACT

An aluminum electrode foil for an electrolytic capacitor has a sponge-like etching layer formed on at least one of the surfaces thereof, and the sponge-like etching layer is reduced in a direction of thickness. The aluminum density of the reduced sponge-like etching layer 'd2' is set from 0.8 to 2.2 g/cm$^3$.

23 Claims, 4 Drawing Sheets

Before reduction   × 1000

After reduction   × 1000
(Draft: 36%)

Before reduction

After reduction (Draft: 36 %)

Magnification of the etching layer
shown in FIG. 2A

Magnification of the etching layer
shown in FIG. 2B

Before reduction    × 1000

After reduction    × 1000
(Draft: 36%)

ALUMINUM ELECTRODE FOIL FOR ELECTROLYTIC CAPACITOR AND ELECTROLYTIC CAPACITOR USING THE FOIL

BACKGROUND OF THE INVENTION

This invention relates to an aluminum electrode foil for an electrolytic capacitor and an electrolytic capacitor using the foil.

An aluminum foil conventionally used as an electrode material for aluminum electrolytic capacitors are treated by electrochemical or chemical etching in general to enlarge its effective area and increase the capacitance per unit area. To improve etching performance, various treatments such as removal of a surface layer of the aluminum foil, formation of an oxide film, annealing and so forth are carried out in most cases before the etching treatment.

However, raising a surface expansion ratio of the aluminum foil as much as possible by etching means formation of a large number of deep etching pits. This invites problems such as a drop of mechanical strength of the aluminum foil and its breakage in a formation process, etc. after etching. The foil is thickened to cope with these problems, but if the foil is thickened, another problem that a size of a capacitor becomes larger arises. For these reasons, a method that can satisfy requirements for the increase of capacitance of an aluminum electrode foil for an electrolytic capacitor simultaneously with improvement of strength has been desired.

In the technical background as described above, the applicant of the present invention has previously proposed a method of producing an aluminum electrode foil for an electrolytic capacitor, comprising steps of reducing an aluminum foil after etching the foil (Japanese Patent Laid-Open No. Hei. 6-204094) as a method capable of improving the strength of the foil without increasing the thickness while ensuring the increase of the capacitance. By this method, reduction of the etched foil can accomplish both increase of the capacitance per unit volume and improvement of the strength of the foil.

However, subsequent studies by the inventors have revealed that even when etched foils are reduced at the same draft, increase of the capacitance per unit volume and improvement of the strength cannot be occasionally obtained depending on etching conditions of the etched foils. From further studies, it was found that aluminum density of a reduced etching layer functions as a dominating factor for effect in increasing capacitance per unit volume and in improving strength of the foil.

The present invention has been completed on the basis of the findings described above and objects are to improve strength of an aluminum electrode foil for an electrostatic capacitor and to increase the capacitance per unit volume.

Another object of the present invention is to provide an aluminum electrode foil for an electrolytic capacitor that can securely accomplish improvement of the strength and increase of the capacitance.

It is still another object of the present invention to provide an aluminum electrolytic capacitor that is small and yet has large capacitance.

The objects of the present invention described above can be accomplished by an aluminum electrode foil for an electrolytic capacitor having a sponge-like etching layer on at least one of the surfaces thereof, wherein the sponge-like etching layer is reduced in a direction of thickness, and aluminum density of the reduced sponge-like etching layer 'd2' is set from 0.8 to 2.2 g/cm$^3$.

The objects of the invention can also be accomplished by an electrolytic capacitor using the above aluminum foil as an electrode material.

Other object, features and advantages of the present invention will become more apparent from the following description taken with the accompanying drawings.

DESCRIPTION OF THE PREFERRED EMBODIMENTS

Figure 1A:
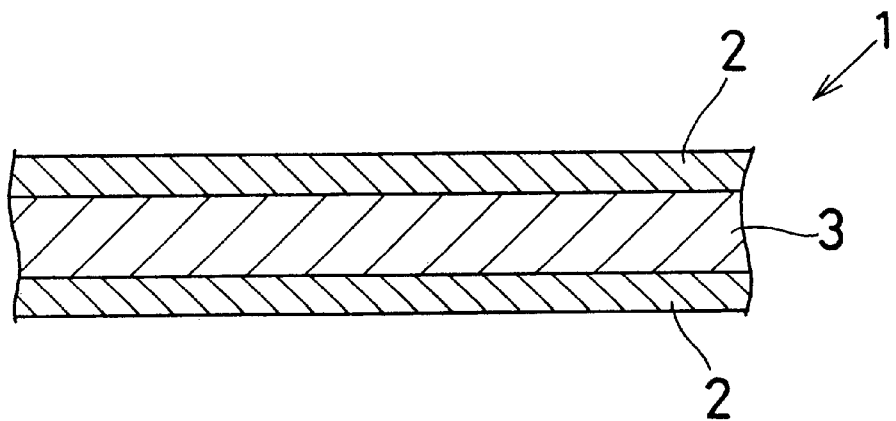
FIG. 1A is a sectional view of an aluminum foil according to an embodiment of the present invention and FIG. 1B is an enlarged schematic sectional view of its etching layer.

In this specification, the terms 'aluminum density', 'thickness' and 'draft' are the mean values.

The aluminum foil used as an electrode foil preferably has high purity of at least 99.9%, but it is not particularly limited thereto. It may have enough purity to be used for the electrode of electrolytic capacitors. The aluminum foil should have finished a foil rolling process and was subjected to final annealing, if required. The thickness is 200 μm or below, preferably from 15 to 120 μm.

The sponge-like etching layer described above can be obtained by etching the aluminum foil. The term 'sponge-like etching layer' represents an etching structure layer 2 having void portions 2a complicatedly communicating with one another in a generally continuous babble form in a three-dimensional direction as shown in FIG. 1B. All of the existing void portions do not have to communicate with one another completely, in other words, the etching structure layer 2 may contain independent void portions in the non communication state. In a tunnel etching type in which pits are formed substantially perpendicular to the direction of thickness of the foil, length of a tunnel-like pit becomes shorter when the foil is reduced and the volume drops corresponding to the draft. Consequently, the effect of reduction cannot be observed. In contrast, in sponge-like etching a decrease of surface areas of void portions becomes smaller than a decrease of the volume of the most void portions. Therefore, the effect of reduction can be obtained.

The sponge-like etching layer 2 described above may be formed on at least one of the surfaces of the aluminum foil, but it is generally formed on both surfaces of the aluminum foil. This sponge-like etching layer 2 is formed by etching the aluminum foil, appropriately combining various etching conditions such as composition of a treating solution, a solution temperature, treatment time and so forth. An example of the etching conditions enabling to form the sponge-like etching layer 2 will be described below. The etching treatment may be either electrochemical etching by applying a voltage or chemical etching without applying voltage. The treating solution may be a mixed solution of HCl, $HNO_3$ and $H_3PO_4$, a mixed solution of HCl, $HNO_3$ and $H_2SO_4$, a mixed solution of HCl, $HNO_3$, $H_3PO_4$ and $H_2SO_4$, a mixed solution of HCl, $HNO_3$, $H_3PO_4$, $H_2SO_4$ and $AlCl_3$, a mixed solution of HCl and $H_2SO_4$, an aqueous HCl solution or the like. The liquid temperature is preferably from about 30 to about 85° C. The treatment time will change depending on the relation to the other etching conditions, but in general it preferably takes from about 1 to about 20 minutes. In electrolytic etching, the impressed voltage is preferably A.C., superimposed alternating current to direct current or a pulse. The current density is preferably set from 3 to 30 $A/dm^2$. The etching treatment may be single stage etching in which the etching treatment is conducted once, or two or more stage etching in which the etching treatment is sequentially carried out at least twice, changing the etching conditions.

Various treatments for improving the etching performance such as removal of a surface layer, formation of an oxide film, annealing, etc., can be carried out before the etching treatment.

The sponge-like etching layer 2 must be reduced in the direction of the thickness. This is because the strength can be improved by reducing the etching layer 2 without lowering the capacitance of the foil too much. The capacitance of the foil does not drop while the etching layer 2 is thinned. It means that the capacitance of the foil per unit volume increases corresponding to a decrease of thickness of the etching layer 2. In other words, a thin, high performance and strong electrode foil can be obtained. If aluminum density of the etching layer 2 after reduction is less than 0.8 $g/cm^3$, the capacitance of the foil per unit volume increases to a certain extent. However, a sufficient effect of improving the strength cannot be obtained, because a large number of voids yet exist. On the other hand, if the aluminum density of the etching layer 2 after reduction exceeds 2.2 $g/cm^3$, the strength of the foil can be improved. However, the effective void portions contributing to improvement of a surface expansion ratio decrease, the capacitance of the foil diminishes, and the capacitance per unit volume of the foil drops off. Therefore, the aluminum density of the etching layer 2 after reduction have to be within the range of 0.8 to 2.2 $g/cm^3$. Preferably, the aluminum density is 1.0 $g/cm^3$ to 1.8 $g/cm^3$, and more preferably, 1.2 $g/cm^3$ to 1.5 $g/cm^3$.

Figure 1B:
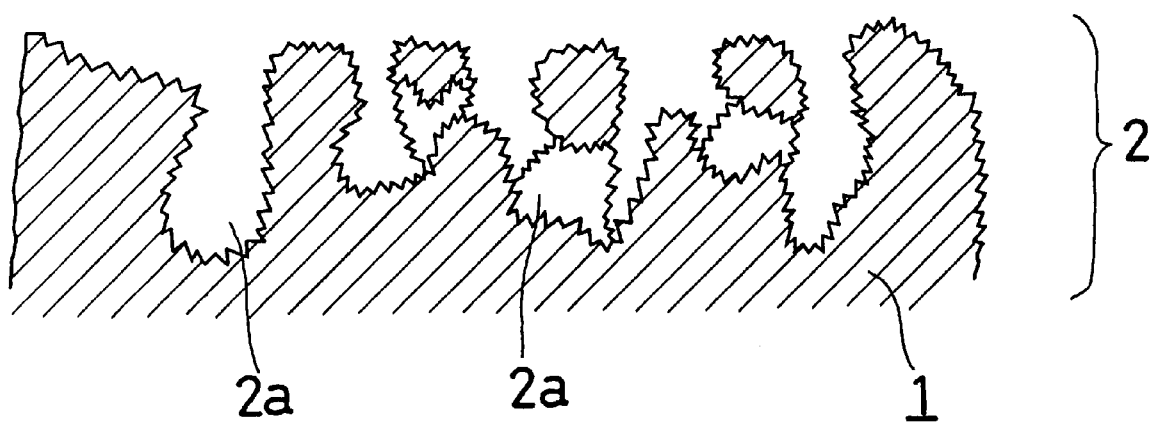
Figure 2A:
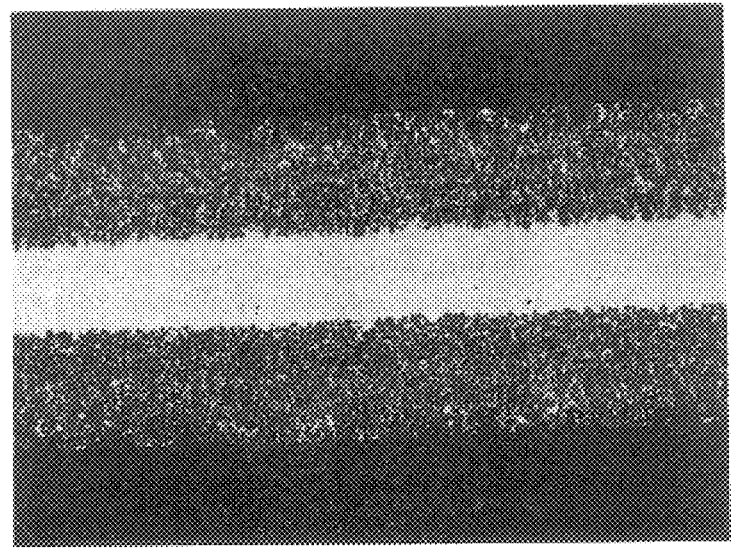
FIG. 2A is a photograph of the section of the aluminum foil before reduction according to the embodiment of the present invention.
Figure 2B:
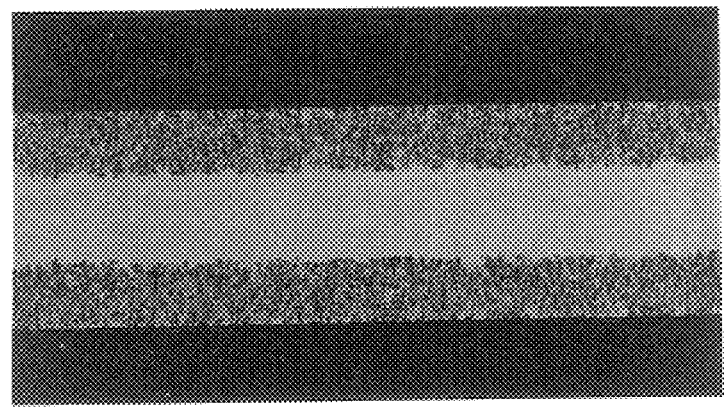
FIG. 2B is a photograph of a section of the aluminum foil after reduction.
Figure 2C:
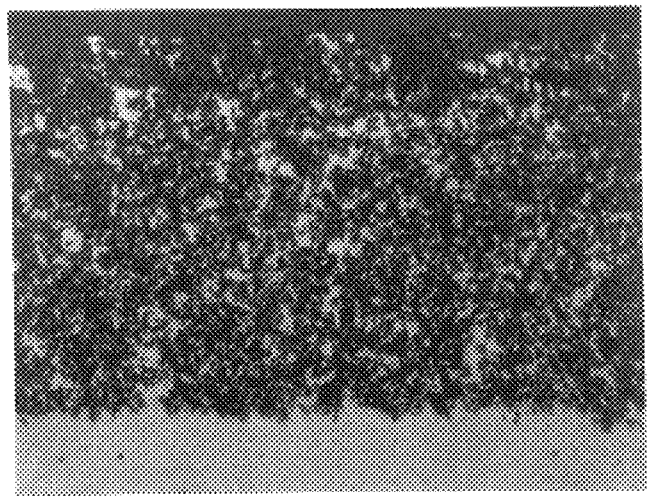
FIG. 2C is a photograph of a magnified section of the etching layer before reduction.
Figure 2D:
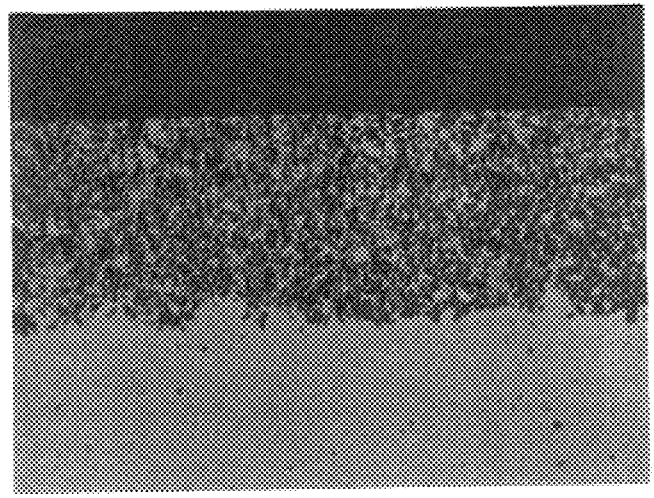
FIG. 2D is a photograph of a magnified section of the etching layer after reduction.

Aluminum density of the etching layer 2 after reduction can be calculated from the equation $(W1-W2)/V1$, where W1 is weight of the aluminum foil, W2 is calculated weight of a core layer 3 shown in FIG. 1A exclusive of the etching layer 2, and V1 is a volume of the etching layer. The aluminum density at the time of reckoning the calculated weight W2 is 2.7 $g/cm^3$.

Reduction of the sponge-like etching layer 2 may be carried out by a plate press or the like, but rolling an aluminum foil after etching is generally preferable. Further, it is desirable to roll an aluminum foil continuously while unwinding the coiled aluminum foil, from the aspect of production efficiency or because reduction can be carried out at constant pressure without variation. More concretely, conventional post treatments such as surface washing, drying, etc. are preferably carried out after etching the aluminum foil, and then the foil is rolled. Rolling is preferably carried out without using rolling oil (lubricant), because, if the void portions of the etching layer are filled with the rolling oil, the capacitance drops and removal of the oil is difficult.

The conditions of the reduction vary with the degrees of etching. In slight etching, the draft may be low. On the contrary, in excessive etching, the draft becomes high. When the sponge-like etching layer is formed on both surfaces of the aluminum foil, the overall draft is selected within the range of 5 to 50%, for example. It is preferable that only the etching layer is substantially reduced, but the core portion exclusive of the etching layer is left intact. When the aluminum foil is reduced to the extent of the core portion, the etching layer is reduced too much, so that the void portions get clogged and both of the capacitance and the strength drop.

Regarding the sponge-like etching layer before reduction, structure and density or the like are not particularly limited. However, to secure a large absolute value of the capacitance, the aluminum density 'd1' is preferably set at 1.0 $g/cm^3$ or below. When the aluminum density of the sponge-like etching layer before reduction 'd1' exceeds 1.0 $g/cm^3$, the capacitance does not increase, because the number of voids formed by etching is small. Therefore, even if reduction is carried out so that the aluminum density of the etching layer after reduction 'd2' becomes from 0.8 to 2.2 $g/cm^3$, the reduction cannot be raised and an effect in improving strength may be weak. More preferably, the aluminum density 'd1' is 0.9 $g/cm^3$ or less. When the aluminum density of the etching layer before reduction 'd1' is less than 0.6 $g/cm^3$, the number of ineffective voids is so great that the capacitance per unit volume after reduction of the etching layer cannot be much increased. Therefore, the aluminum density before reduction 'd1' is set at least 0.6 $g/cm^3$, and more preferably, from 0.7 to 0.9 $g/cm^3$.

The ratio 'd2/d1' of the aluminum density of the sponge-like layer after reduction 'd2' to that of the layer before reduction 'd1' is preferably from 1.2 to 3.7. If the ratio 'd2/d1' is less than 1.2, reduction is sometimes insufficient and the effect in improving strength is low even though the aluminum density of the sponge-like etching layer before reduction is 1.0 $g/cm^3$ or less. On the other hand, if the ratio 'd2/d1' exceeds 3.7, reduction becomes excessive, so that the voids decrease or the void portions get clogged, the overall capacitance drops and eventually, the effect of increasing the capacitance per unit volume cannot be obtained in some cases. From the aspects of both strength and capacitance, more preferably, the ratio 'd2/d1' is from 1.3 to 2.7.

The aluminum foil in which the aluminum density of the etching layer 2 after reduction 'd2' is set from 0.8 to 2.2 $g/cm^3$ may be annealed, as occasion required, at a temperature from 200 to 500° C. in order to improve the elongation. Particularly when vacuum annealing is conducted, fine pores clogged partially due to rolling are ruptured and opened again. Weak etching may be carried out after rolling to remove the clogged portions which thinly covered fine pores in part.

The aluminum foil described above may be used for the cathodized electrode foil for the electrolytic capacitor in its intact form, or may be used for the anodized electrode foil after carrying out anodic oxidation in a solution or an aqueous solution of boric acid, ammonium borate, ammonium adipate, ammonium tartrate or the like to form an oxide film.

According to the present invention, the sponge-like etching layer is formed on at least one of the surfaces of the aluminum foil, the sponge-like etching layer is reduced in the direction of thickness, and the aluminum density of the reduced sponge-like etching layer 'd2' is controlled to the range from 0.8 to 2.2 $g/cm^3$. Therefore, in comparison with conventional etched foils without reduction, improvement of the strength and increase of the capacitance per unit volume can be accomplished by the present invention more reliably and stably. Moreover, because draft is not need of control during the production and aluminum density of the sponge-like etching layer of finished products may only be controlled, control of various aluminum electrode foils becomes extremely easy.

When the aluminum density of the sponge-like etching layer before reduction 'd1' is 1.0 g/cm$^3$ and less, or when the ratio 'd2/d1' of the aluminum density of the sponge-like layer after reduction 'd2' to that of the layer before reduction 'd1' is from 1.2 to 3.7, improvement of the strength and increase of the capacitance per unit volume can be obtained more reliably and stably, and the control becomes further easier.

The aluminum electrolytic capacitor using the aluminum foil described above as the electrode material can be increased the capacitance when the capacitor is set at the same size as a conventional electrolytic capacitor, and the size can be diminished when the capacitance is set at the same value as a conventional capacitor.

EXAMPLES

A plurality of coiled aluminum foils having purity of 99.98% and thickness of 108 μm were annealed at 300° C. for 6 hours in the N$_2$ gas atmosphere.

Next, while each coil was being unwound, etching treatment was carried out under various conditions as listed in Table 1 to form sponge-like etching layers on both surfaces of each aluminum foil. The aluminum density of this etching layers 'd1' were shown in Table 2.

Then, these etching foils were respectively rolled at different drafts, at a rolling rate of 100 m/min without a lubricant.

The aluminum density of each etching layer after rolling 'd2' was measured and the ratio of aluminum density of the etching layer before reduction to that of the layer after reduction 'd2/d1' was calculated. The results are shown in Table 2.

The aluminum density of the etching layer 'd1' and 'd2' were determined by the equation (W1−W2)/V1, where W1 is the weight of the aluminum foil, W2 is the calculated weight of the core layer and V1 is the volume of the etching layer.

Each aluminum foil is produced under the above conditions. Then, the tensile strength was measured before and after reduction and the capacitance of each of the aluminum foil before and after reduction was determined after formation in an ammonium adipate bath with 20 V. Table 2 shows the relative ratio of the capacitance per unit volume calculated from the capacitance of the aluminum foils before and after reduction, and the draft.

Figure 3A:
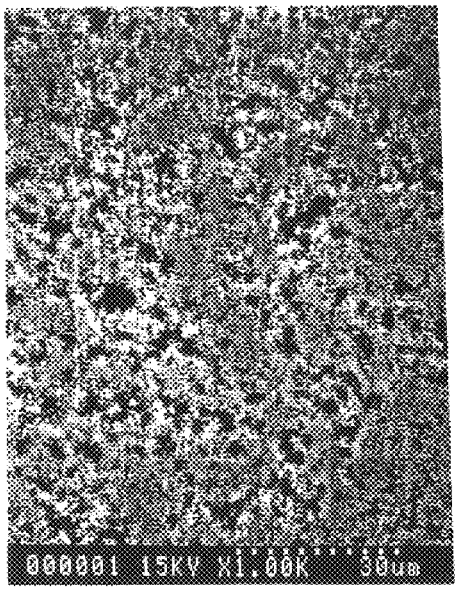
FIG. 3A is an electron micrograph of the surface of the etching layer before reduction according to the embodiment of the present invention shown in FIGS. 2A to 2D.
Figure 3B:
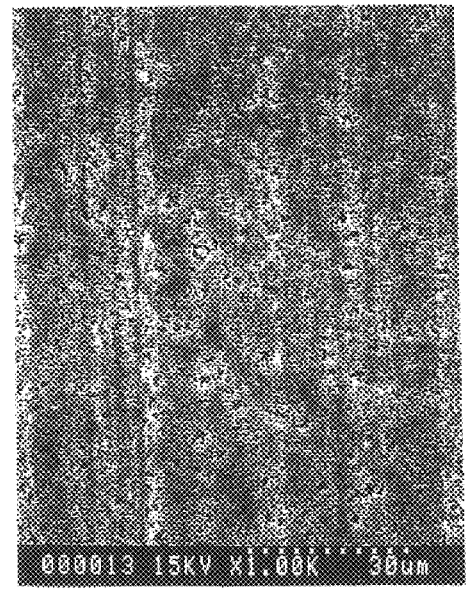
FIG. 3B is an electron micrograph of the surface of the etching layer after reduction.

FIGS. 2A to 2D are photographs of the sections of the sample of Embodiment No. 7 before and after reduction, and FIGS. 3A and 3B show secondary electron images of the surface of the etching layer before and after reduction, respectively.

TABLE 1

| kind of etching | bath composition | liquid temperature (° C.) | condition of electrolysis | treatment time (minute) |
|---|---|---|---|---|
| A | 7% HCl + 0.6% HNO$_3$ + 0.1% H$_2$SO$_4$ | 35 | AC50 Hz, 15A/dm$^2$ | 14 |
| B | 5% HCl + 0.3% H$_3$PO$_4$ + 0.1% HNO$_3$ | 50 | AC60 Hz, 15A/dm$^2$ | 18 |
| C | same as A | 35 | AC50 Hz, 15A/dm$^2$ | 10 |
| D | same as B | 50 | AC60 Hz, 15A/dm$^2$ | 16 |
| E | same as A | 35 | AC50 Hz, 15A/dm$^2$ | 16 |
| F | same as A | 35 | AC50 Hz, 15A/dm$^2$ | 12 |

TABLE 2

| | | | Before reduction | | | After reduction | | | |
|---|---|---|---|---|---|---|---|---|---|
| Sample No. | | kind of etching | density of etching layer 'd1' (g/cm$^3$) | tensile strength (kg/mm$^2$) | draft (%) | density of etching layer 'd2' (g/cm$^3$) | tensile strength (kg/mm$^2$) | d2/d1 | capacitance per unit thickness* |
| Comparison | 1 | A | 0.80 | 1.95 | 50 | 2.32 | 6.80 | 2.9 | 90 |
| | 2 | B | 0.62 | 1.30 | 4 | 0.74 | 1.35 | 1.16 | 104 |
| | 3 | C | 1.10 | 2.56 | 35 | 2.45 | 7.20 | 2.27 | 90 |
| Embodiment | 1 | D | 0.53 | 1.18 | 45 | 1.87 | 2.56 | 3.5 | 103 |
| | 2 | B | 0.62 | 1.30 | 20 | 0.94 | 1.62 | 1.5 | 113 |
| | 3 | B | 0.62 | 1.30 | 40 | 1.46 | 3.05 | 2.35 | 130 |
| | 4 | E | 0.71 | 1.85 | 20 | 1.07 | 2.30 | 1.51 | 120 |
| | 5 | E | 0.71 | 1.85 | 25 | 1.25 | 2.54 | 1.76 | 126 |
| | 6 | A | 0.80 | 1.95 | 8 | 0.98 | 2.36 | 1.23 | 109 |
| | 7 | A | 0.80 | 1.95 | 36 | 1.82 | 4.83 | 2.28 | 139 |
| | 8 | A | 0.80 | 1.95 | 46 | 2.18 | 5.90 | 2.73 | 124 |
| | 9 | F | 0.92 | 2.15 | 20 | 1.46 | 2.37 | 1.59 | 118 |
| | 10 | F | 0.92 | 2.15 | 30 | 1.70 | 3.70 | 1.85 | 132 |

*Capacitance per unit thickness SPT is calculated by: (C2/C1) × (100/(100 − AR)) where C1 is capacitance of an aluminum foil before reduction, C2 is capacitance of an aluminum foil after reduction and AR is a draft (%).

From the result in table 2, it is found that the aluminum foil according to the present invention was remarkably improved in strength and capacitance per unit volume.

In contrast, in comparison Nos. 1 and 3, the density of the etching layer after reduction is exceeded the range of the present invention, the capacitance per unit volume dropped though the effect in improving strength is observed. In comparison No. 2, the density of the etching layer after reduction was lower than the range of the present invention, and the effect in improving strength was low though the capacitance per unit volume increased to some extent.

The same sample as embodiment No. 5 was reduced and vacuum annealed at 350° C. for 5 hours. Then, formation was made in an ammonium adipate bath with 20 V. In that case, the relative ratio of the capacity per unit of the embodiment to the one before reduction was 128. Whereas the elongation of the embodiment No. 5 after reduction was 0.6%, the elongation of the product that was vacuum annealed at 350° C. for 5 hours after reduction was 0.8%. Thus, the elongation was improved.

What is claimed is:

1. An aluminum electrode foil for an electrolytic capacitor characterized in that a sponge-like etching layer is formed on at least one surface of said foil, said sponge-like etching layer is reduced in the direction of thickness, and aluminum density of said sponge-like etching layer after reduction 'd2' is set from 0.8 to 2.2 g/cm$^3$.

2. An aluminum electrode foil for an electrolytic capacitor according to claim 1, wherein the aluminum density of said sponge-like etching layer after reduction 'd2' is 1.0 g/cm$^3$ to 2.2 g/cm$^3$.

3. An aluminum electrode foil for an electrolytic capacitor according to claim 1, wherein the aluminum density of said sponge-like etching layer after reduction 'd2' is 0.8 g/cm$^3$ to 1.8 g/cm$^3$.

4. An aluminum electrode foil for an electrolytic capacitor according to claim 1, wherein the aluminum density of said sponge-like etching layer after reduction 'd2' is 1.2 g/cm$^3$ to 2.2 g/cm$^3$.

5. An aluminum electrode foil for an electrolytic capacitor according to claim 1, wherein the aluminum density of said sponge-like etching layer after reduction 'd2' is 0.8 g/cm$^3$ to 1.5 g/cm$^3$.

6. An aluminum electrode foil for an electrolytic capacitor according to claim 1, wherein aluminum density of said sponge-like etching layer before reduction 'd1' is less than or equal to 1.0 g/cm$^3$.

7. An aluminum electrode foil for an electrolytic capacitor according to claim 1, wherein aluminum density of said sponge-like etching layer before reduction 'd1' is 0.6 g/cm$^3$ to 0.9 g/cm$^3$.

8. An aluminum electrode foil for an electrolytic capacitor according to claim 1, wherein aluminum density of said sponge-like etching layer before reduction 'd1' is equal to or greater than 0.6 g/cm$^3$.

9. An aluminum electrode foil for an electrolytic capacitor according to claim 1, wherein aluminum density of said sponge-like etching layer before reduction 'd1' is from 0.7 to 0.9 g/cm$^3$.

10. An aluminum electrode foil for an electrolytic capacitor according to claim 1, wherein a ratio 'd2/d1' of the aluminum density of said sponge-like etching layer after reduction 'd2' to that of said layer before reduction 'd1' is from 1.2 to 3.7.

11. An aluminum electrode foil for an electrolytic capacitor according to claim 1, wherein a ratio 'd2/d1' of the aluminum density of said sponge-like etching layer after reduction 'd2' to that of said layer before reduction 'd1' is from 1.3 to 2.7.

12. An aluminum electrode foil for an electrolytic capacitor characterized in that a sponge-like etching layer is formed on at least one surface of said foil, said sponge-like etching layer is reduced in the direction of thickness, aluminum density of said sponge-like etching layer before reduction 'd1' is set at 0.6 g/cm$^3$ to 1.0 g/cm$^3$, and aluminum density of said sponge-like etching layer after reduction 'd2' is set from 0.8 to 2.2 g/cm$^3$.

13. An aluminum electrode foil for an electrolytic capacitor characterized in that a sponge-like etching layer is formed on at least one surface of said foil, said sponge-like etching layer is reduced in the direction of thickness, aluminum density of said sponge-like etching layer after reduction 'd2' is set from 0.8 to 2.2 g/cm$^3$, and a ratio 'd2/d1' of the aluminum density of said sponge-like etching layer after reduction 'd2' to that of said layer before reduction 'd1' is from 1.2 to 3.7.

14. An aluminum electrode foil for an electrolytic capacitor characterized in that a sponge-like etching layer is formed on at least one surface of said foil, said sponge-like etching layer is reduced in the direction of thickness, aluminum density of said sponge-like etching layer before reduction 'd1' is 0.6 g/cm$^3$ to 1.0 g/cm$^3$, aluminum density of said sponge-like etching layer after reduction 'd2' is set from 0.8 to 2.2 g/cm$^3$, and a ratio 'd2/d1' of aluminum density of said sponge-like etching layer after reduction 'd2' to that of said layer before reduction 'd1' is from 1.2 to 3.7.

15. An aluminum electrode foil for an electrolytic capacitor characterized in that a sponge-like etching layer is formed on at least one surface of said foil, said sponge-like etching layer is reduced in the direction of thickness, aluminum density of said sponge-like etching layer after reduction 'd2' is set from 0.8 to 2.2 g/cm$^3$, and annealing is carried out at a temperature from 200 to 500° C. after reduction.

16. An aluminum electrode foil for an electrolytic capacitor characterized in that a sponge-like etching layer is formed on at least one surface of said foil, said sponge-like etching layer is reduced in the direction of thickness, aluminum density of said sponge-like etching layer before reduction 'd1' is 0.6 g/cm$^3$ to 1.0 g/cm$^3$, aluminum density of said sponge-like etching layer after reduction 'd2' is set from 0.8 to 2.2 g/cm$^3$, and annealing is carried out at a temperature from 200 to 500° C. after reduction.

17. An aluminum electrode foil for an electrolytic capacitor characterized in that a sponge-like etching layer is formed on at least one surface of said foil, said sponge-like etching layer is reduced in the direction of thickness, aluminum density of said sponge-like etching layer after reduction 'd2' is set from 0.8 to 2.2 g/cm$^3$, a ratio 'd2/d1' of aluminum density of said sponge-like etching layer after reduction 'd2' to that of the layer before reduction 'd1' is from 1.2 to 3.7, and annealing is carried out after reduction at a temperature from 200 to 500° C.

18. An aluminum electrode foil for an electrolytic capacitor characterized in that a sponge-like etching layer is formed on at least one surface of said foil, said sponge-like etching layer is reduced in the direction of thickness, aluminum density of said sponge-like etching layer before reduction 'd1' is 0.6 g/cm$^3$ to 1.0 g/cm$^3$, aluminum density of said sponge-like etching layer after reduction 'd2' is set from 0.8 to 2.2 g/cm$^3$, a ratio 'd2/d1' of aluminum density of said sponge-like etching layer after reduction 'd2' to that of said layer before reduction 'd1' is from 1.2 to 3.7, and annealing is carried out at a temperature of 200 to 500° C. after reduction.

19. An aluminum electrode foil for an electrolytic capacitor according to any one of claims 15 to 18, wherein the annealing after reduction is conducted under vacuum.

20. An electrolytic capacitor using an aluminum foil as an electrode material, wherein said aluminum foil has a sponge-like etching layer formed on at least one surface thereof, said sponge-like etching layer is reduced in the direction of thickness and aluminum density of said sponge-like etching layer after reduction 'd2' is set form 0.8 to 2.2 g/cm$^3$.

21. An electrolytic capacitor using an aluminum roil as an electrode material, wherein said aluminum foil has a sponge-like etching layer formed on at least one surface thereof, said sponge-like etching layer is reduced in the direction of thickness, aluminum density of said sponge-like etching layer before reduction 'd1' is 0.6 g/cm$^3$ to 1.0 g/cm$^3$, and aluminum density of said sponge-like etching layer after reduction 'd2' is set from 0.8 to 2.2 g/cm$^3$.

22. An electrolytic capacitor using an aluminum foil as an electrode material, wherein said aluminum foil has a sponge-like etching layer formed on at least one surface thereof, said sponge-like etching layer is reduced in the direction of thickness, aluminum density of said sponge-like etching layer after reduction 'd2' is set from 0.8 to 2.2 g/cm$^3$, and a ratio 'd2/d1' of aluminum density of said sponge-like etching layer after reduction 'd2' to that of said layer before reduction 'd1' is from 1.2 to 3.7.

23. An electrolytic capacitor using an aluminum foil as an electrode material, wherein said aluminum foil has a sponge-like etching layer formed on at least one surface thereof, said sponge-like etching layer is reduced in the direction of thickness, aluminum density of said sponge-like etching layer before reduction 'd1' is 0.6 g/cm$^3$ to 1.0 g/cm$^3$, aluminum density of said sponge-like etching layer after reduction 'd2' is set from 0.8 to 2.2 g/cm$^3$, and a ratio 'd2/d1' of aluminum density of said sponge-like etching layer after reduction 'd2' to that of said layer before reduction 'd1' is from 1.2 to 3.7.

* * * * *